(12) United States Patent
Proença et al.

(10) Patent No.: US 11,848,025 B2
(45) Date of Patent: Dec. 19, 2023

(54) METHODS FOR MEASURING SPEECH INTELLIGIBILITY, AND RELATED SYSTEMS AND APPARATUS

(71) Applicant: ELSA, Corp., Los Gatos, CA (US)

(72) Inventors: Jorge Daniel Leonardo Proença, Lisbon (PT); Xavier Anguera Miro, Lisbon (PT); Ganna Raboshchuk, Lisbon (PT); Ângela Maria Pereira da Costa, Lisbon (PT)

(73) Assignee: ELSA, Corp., Los Gatos, CA (US)

(*) Notice: Subject to any disclaimer, the term of this patent is extended or adjusted under 35 U.S.C. 154(b) by 0 days.

(21) Appl. No.: 17/150,341

(22) Filed: Jan. 15, 2021

(65) Prior Publication Data
US 2021/0225389 A1 Jul. 22, 2021

Related U.S. Application Data

(60) Provisional application No. 62/962,402, filed on Jan. 17, 2020.

(51) Int. Cl.
*G10L 21/0364* (2013.01)
*G10L 17/24* (2013.01)
(Continued)

(52) U.S. Cl.
CPC ........ *G10L 21/0364* (2013.01); *G10L 15/187* (2013.01); *G10L 15/26* (2013.01);
(Continued)

(58) Field of Classification Search
CPC ... G10L 21/0364; G10L 15/187; G10L 15/26; G10L 17/24; G10L 25/51;
(Continued)

(56) References Cited

U.S. PATENT DOCUMENTS 5,799,273 A * 8/1998 Mitchell ................ G06F 3/16
704/E15.04
6,519,562 B1 2/2003 Phillips et al.
(Continued)

FOREIGN PATENT DOCUMENTS

JP 2015197621 A 11/2015

OTHER PUBLICATIONS

U.S. Appl. No. 17/119,876, filed Dec. 11, 2020, Otero et al.
(Continued)

*Primary Examiner* — Fariba Sirjani
(74) *Attorney, Agent, or Firm* — Goodwin Procter LLP

(57) ABSTRACT

In a method for efficiently and accurately measuring the intelligibility of speech, a user may utter a sample text, and an automatic speech assessment (ASA) system may receive an acoustic signal encoding the utterance. An automatic speech recognition (ASR) module may generate an N-best output corresponding to the utterance and generate an intelligibility score representing the intelligibility of the utterance based on the N-best output and the sample text. Generating the intelligibility score may involve (1) calculating conditional intelligibility value(s) for the N recognition result(s), and (2) determining the intelligibility score based on the conditional intelligibility value of the most intelligible recognition result. Optionally, the process of generating the intelligibility score may involve adjusting the intelligibility score to account for environmental information (e.g., a pronunciation score for the user's speech and/or a confidence score assigned to the 1-best recognition result). N may be greater than or equal to 2.

19 Claims, 5 Drawing Sheets

(51) Int. Cl.
  G10L 25/51 (2013.01)
  G10L 15/26 (2006.01)
  G10L 15/187 (2013.01)
  G10L 25/78 (2013.01)
  G10L 15/22 (2006.01)

(52) U.S. Cl.
  CPC ............ *G10L 17/24* (2013.01); *G10L 25/51* (2013.01); *G10L 2015/225* (2013.01); *G10L 2025/783* (2013.01)

(58) Field of Classification Search
  CPC ......... G10L 2015/225; G10L 2025/783; G10L 15/08; G10L 25/27; G10L 25/60; G09B 5/00
  See application file for complete search history.

(56) References Cited

U.S. PATENT DOCUMENTS

| | | | | |
|---|---|---|---|---|
| 7,006,967 | B1* | 2/2006 | Kahn | G10L 15/075 704/277 |
| 8,407,050 | B2* | 3/2013 | Kobal | G10L 15/22 704/235 |
| 8,744,856 | B1 | 6/2014 | Ravishankar | |
| 9,384,730 | B2* | 7/2016 | Kurata | G10L 15/197 |
| 9,613,638 | B2* | 4/2017 | Loukina | G09B 19/04 |
| 11,495,139 | B2 | 11/2022 | López Otero et al. | |
| 2002/0147587 | A1 | 10/2002 | Townshend et al. | |
| 2005/0114131 | A1* | 5/2005 | Stoimenov | G10L 15/26 704/E15.045 |
| 2008/0221890 | A1* | 9/2008 | Kurata | G10L 15/063 704/E15.005 |
| 2009/0111085 | A1 | 4/2009 | Rudy et al. | |
| 2010/0004930 | A1* | 1/2010 | Strope | G10L 15/32 704/251 |
| 2010/0145698 | A1* | 6/2010 | Chen | G09B 7/02 704/256.1 |
| 2012/0166193 | A1* | 6/2012 | Kobal | G10L 15/22 704/235 |
| 2012/0278075 | A1 | 11/2012 | Shammass et al. | |
| 2014/0358533 | A1* | 12/2014 | Kurata | G10L 15/08 704/231 |
| 2014/0365209 | A1* | 12/2014 | Evermann | G06F 40/35 704/9 |
| 2015/0151985 | A1 | 6/2015 | Johnson et al. | |
| 2015/0161985 | A1* | 6/2015 | Peng | G10L 15/26 704/235 |
| 2015/0248898 | A1* | 9/2015 | Loukina | G09B 19/04 704/239 |
| 2017/0309202 | A1 | 10/2017 | Chen | |
| 2019/0385480 | A1 | 12/2019 | Suzuki | |

OTHER PUBLICATIONS

Abdi, S. et al., "A Multivariate Elo-based Learner Model for Adaptive Educational Systems," CoRR vol. 1910-12581, Proceedings of the 12th International Conference on Education Data Mining (2019) 6 pages.

Anguera, X. et al., "English Language Speech Assistant," *Interspeech 2016: Show & Tell Contribution*, (2016), 2 pages.

Arora, S.J. et al., "Automatic Speech Recognition: A Review," International Journal of Computer Applications, vol. 60, No. 9, (Dec. 2012), 11 pages.

Gao, Y. et al., "Spoken English Intelligibility Remediation with PocketSphinx Alignment and Feature Extraction Improves Substantially over the State of the Art," (2017), 5 pages.

Ghahramani, Z. et al., "An Introduction to Hidden Markov Models and Bayesian Networks", International Journal of Pattern Recognition and Artificial Intelligence 15(1): 9-42, (2001), 25 pages.

Jiang, H., "Confidence measures for speech recognition: A survey," Speech Communication, vol. 45, No. 4, (2005), pp. 455-470.

Kibishi, H. et al., "New feature parameters for pronunciation evaluation in English presentations at international conferences," Interspeech, ISCA, (2011), 4 pages.

Liu, L. et al., "SARLR: Self-adaptive Recommendation of Learning Resources," ITS 2018 Workshop Proceedings: Montreal, QC, Canada (Jun. 11-15, 2018) pp. 151-158.

Pelanek, R., "Applications of the Elo Rating System in Adaptive Educational Systems," Computers and Education (2016) 16 pages.

Povey, D. et al., "The Kaldi speech recognition toolkit," *IEEE Automatic Speech Recognition and Understanding Workshop (ASRU)*, (2011), 4 pages.

Prisco, A. et al., "A multidimensional ELO model for matching learning objects," IEEE Frontiers in Education Conference (FIE), San Jose, CA (2018) pp. 1-9.

Yu, Y., "A Speech Quality and Intelligibility Assessment Project Using Google Voice", American Society for Engineering Education, 121st ASEE Annual Conference & Exposition, Paper ID# 10627, (2014), 11 pages.

International Search Report and Written Opinion for PCT/US2021/013649 dated Jul. 22, 2021.

International Search Report and Written Opinion PCT/US2021/013649 dated Apr. 30, 2021.

J. Hou, M. W. Koppatz, J. M. Hoya Quecedo, N. Stoyanova, M. Kopotek, R. Yangarber, "Modeling language learning using specialized Elo ratings", Proceedings of the 14th Workshop on Innovative Use of NLP for Building Educational Applications, pp. 494-506, Aug. 2, 2019.

K. Wauters, P. Desmet, W. Van Den Noortgate, "Item difficulty estimation: An auspicious collaboration between data and judgement", Computers & Education 58, pp. 1183-1193 (2012).

Kawai G et al., "Teaching the pronunciation of Japanese double-mora phonemes using speech recognition technology", Speech Communication, Elsevier Science Publishers, Amsterdam, NL, vol. 30, No. 2-3, Feb. 1, 2000, pp. 131-143.

Koedinger, Kenneth R., Albert T. Corbett, and Charles Perfetti. 'The Knowledge-Learning-Instruction Framework: Bridging the Science-Practice Chasm to Enhance Robust Student Learning'. Cognitive Science 36, No. 5 (Jul. 2012): 757-98.

Pelánek, Radek. 'Applications of the Elo Rating System in Adaptive Educational Systems'. Computers & Education 98 (Jul. 2016): 169-79. Available at https://doi.org/10.1016/j.compedu.2016.03.017.

Riedhammer K et al., "Towards robust automatic evaluation of pathologic telephone speech", Automatic Speech Recognition & Understanding, 2007. ASRU. IEEE Works Hop on, IEEE, PI, Dec. 1, 2007, pp. 717-722.

S. Klinkenberg, M. Straatemeier, H.L.J. van der Maas, "Computer adaptive practice of Maths ability using a new item response model for on the fly ability and difficulty estimation", Computers & Education 57, 1813-1824 (2011).

U.S. Appl. No. 17/681,438, filed Feb. 25, 2022, P. López Otero.

\* cited by examiner

400

| Receive an acoustic signal encoding an utterance of a user | — 410 |

| Generate an N-best output corresponding to the utterance | — 420 |

| Generate an intelligibility score representing the intelligibility of the utterance based on the N-best output and the sample text, where (1) N is at least 2, (2) the intelligibility score is also based on a confidence score, where the confidence score indicates the probability that a particular one of the recognition results is a correct transcription of the utterance, and/or (3) the intelligibility score is also based on a pronunciation score for the utterance, where the pronunciation score indicates an extent to which the utterance exhibits correct pronunciation of the sample text. | — 430 |

FIG. 4

METHODS FOR MEASURING SPEECH INTELLIGIBILITY, AND RELATED SYSTEMS AND APPARATUS

CROSS REFERENCE TO RELATED APPLICATIONS

This application claims priority to and benefit of U.S. Provisional Patent Application No. 62/962,402, titled "Methods for Measuring Speech Intelligibility, and Related Systems and Apparatus" and on Jan. 17, 2020, which is hereby incorporated by reference herein in its entirety. Unless noted to the contrary, all publications, references, patents and/or patent applications referenced herein are hereby incorporated by reference herein in their entirety for all purposes.

FIELD OF THE DISCLOSURE

This disclosure relates generally to automatic speech assessment (ASA), and describes novel and improved methods for assessing the intelligibility of speech.

BACKGROUND

In general, automatic speech assessment (ASA) systems are computer systems that can process and assess the quality of spoken human speech. ASA systems are often used to assess a person's proficiency in speaking a certain language (e.g., a language other than the speaker's native language). In operation, an ASA system may provide a prompt to a user, which prompts the user to utter a verbal response in a particular language. For example, the ASA system may prompt the user to read aloud a word, phrase or passage of text. The ASA system may then analyze the user's utterance using, for example, an automated speech recognition (ASR) module that generates a transcript of the utterance. Using the transcript and other information extracted from the response, the ASA system may analyze the utterance and provide an assessment of the user's proficiency in using the language. Such systems may be used to evaluate, for example, a person's pronunciation skill, fluency, and/or rate of speech.

Feedback on a speaker's pronunciation is vital for spoken language teaching and learning applications. Using automatic pronunciation assessment techniques, ASA systems can assess a speaker's pronunciation and provide feedback on pronunciation errors, which can help speakers (e.g., non-native speakers) identify and understand their errors, learn sounds and vocabulary, and improve their pronunciation performance. A companion to the pronunciation assessment is intelligibility assessment. Using intelligibility assessment techniques, ASA systems can assess the degree to which a user's speech is likely to be understood by listeners who are proficient in the language, which can help users learn to speak more intelligibly.

SUMMARY

As used herein, "intelligibility" refers to the extent or degree to which a person's speech in a given language is likely to be understood by listeners who are proficient (e.g., fluent) in that language. ASA systems with intelligibility assessment (IA) capabilities can use those IA capabilities to enhance many types of ASA applications. For example, language teaching and learning applications can provide feedback to users regarding the intelligibility of their speech, which can help such users identify and correct deficiencies in their speech skills. Such feedback can be vital in helping non-native speakers of a language to speak the language fluently.

As another example, voice interface applications can use intelligibility assessment techniques to distinguish between scenarios in which a user's speech is intelligible but the content of the user's speech is unexpected or incorrect (e.g., an incorrect response to a security prompt) and scenarios in which the user's speech is not intelligible. When a voice interface application correctly differentiates between those two scenarios, the application can respond more appropriately to the user's speech (e.g., by prompting the user to repeat an utterance when the user's speech is unintelligible, or by denying a user access to sensitive information when the user's response to a security prompt is intelligible but incorrect).

As yet another example, communication applications (e.g., applications for mobile telephony, audio conferencing, video conferencing, dictation, call center (e.g., customer service) analytics, call center 'bots' or helpers, etc.) can use intelligibility assessment techniques to automatically enhance the intelligibility of a user's speech within the application (e.g., by monitoring the intelligibility of the user's speech and adaptively adjusting parameters of the communication channel to increase the speech's intelligibility). In addition or in the alternative, communication applications can monitor the intelligibility of a user's speech and prompt the user to make adjustments that are likely to increase the intelligibility of his or her speech (e.g., by prompting the user to move closer to the microphone, speak more slowly, etc.).

Conventional approaches to assessing speech intelligibility can be cumbersome and/or inaccurate/subjective. For example, human evaluators may be used to judge the intelligibility of a person's speech. However, human (or "manual") assessments of speech intelligibility can be highly subjective and/or dependent on the human evaluator's skills or biases. In addition, different human evaluators may use different scales to judge the intelligibility of a person's speech. As a result, intelligibility scores provided by different human evaluators may be very difficult to compare. Therefore, it would be desirable to provide an objective measure of the intelligibility of speech.

It may be possible to train classifiers to measure the intelligibility of speech by applying machine learning techniques to large amounts of manually-labeled training data. However, manually labeling large amounts of training data is very cumbersome and can introduce subjectivity into the labels, particularly when different annotators label different subsets of training data, for the reasons described above. It may be possible to measure the intelligibility of speech based on the 1-best output of an ASR module. However, the inventors have observed that the intelligibility scores produced using such techniques can be inaccurate.

The present disclosure describes improved techniques for efficiently and accurately measuring the intelligibility of speech. In some embodiments, a user may utter a sample text, and an ASA system may receive an acoustic signal encoding the user's utterance. An ASR module may then generate an N-best output corresponding to the utterance and generate an intelligibility score representing the intelligibility of the utterance based on the N-best output and the sample text. The process of generating the intelligibility score may include two phases: (1) calculating conditional intelligibility value(s) for the N-best recognition result(s), and (2) determining the intelligibility score based on the conditional intelligibility value of the most intelligible recognition result. Optionally, the process of generating the intelligibility score may include a third phase, in which the intelligibility score is adjusted to account for environmental information (e.g., a pronunciation score for the user's speech and/or a confidence score assigned to the 1-best recognition result). In some embodiments, N may be greater than or equal 2.

In general, one innovative aspect of the subject matter described in this specification can be embodied in a computer-implemented speech intelligibility scoring method, including: receiving an acoustic signal encoding an utterance of a user, wherein the utterance includes a verbalization of a sample text by the user; generating, by an automatic speech recognition (ASR) module, an N-best output corresponding to the utterance, wherein the N-best output includes N recognition results generated by the ASR module for the utterance, wherein N is a positive integer; and generating an intelligibility score representing an intelligibility of the utterance based, at least in part, on the N-best output and the sample text, wherein (1) N is at least 2, (2) the generating of the intelligibility score is further based on a confidence score, wherein the confidence score indicates a probability that a particular one of the recognition results is a correct transcription of the utterance, and/or (3) the generating of the intelligibility score is further based on a pronunciation score for the utterance, wherein the pronunciation score indicates an extent to which the utterance exhibits correct pronunciation of the sample text.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, generating the intelligibility score includes calculating N conditional intelligibility values corresponding, respectively, to the N recognition results, wherein each of the conditional intelligibility values represents a conditional intelligibility of the utterance assuming that the recognition result corresponding to the respective conditional intelligibility value is the correct transcription of the utterance; determining, based on the conditional intelligibility values, which of the recognition results is most intelligible; and calculating the intelligibility score based, at least in part, on the conditional intelligibility value of the most intelligible recognition result.

In some embodiments, calculating the N conditional intelligibility values includes normalizing the sample text and the N recognition results; and, for each of the N normalized recognition results: aligning the respective normalized recognition result to the normalized sample text on a word-for-word basis, calculating an error rate of the aligned recognition result based on a number of errors in the aligned recognition result relative to the normalized sample text, and calculating the respective conditional intelligibility value based on the error rate of the aligned recognition result. In some embodiments, aligning the respective normalized recognition result to the normalized sample text on a word-for-word basis includes calculating a distance between the normalized sample text and the respective normalized recognition result. In some embodiments, the distance is an edit distance.

In some embodiments, calculating the intelligibility score includes: if N is 1, setting the intelligibility score to the conditional intelligibility value of the most intelligible recognition result; otherwise, if the most intelligible recognition result is the 1-best recognition result, setting the intelligibility score to the conditional intelligibility value of the most intelligible recognition result; and otherwise, setting the intelligibility score to a combined value, wherein the combined value is based on the conditional intelligibility value of the most intelligible recognition result and the conditional intelligibility value of the 1-best recognition result.

In some embodiments, the combined value is a weighted sum of the conditional intelligibility value of the most intelligible recognition result and the conditional intelligibility value of the 1-best recognition result. In some embodiments, the confidence score indicates the probability that the most intelligible recognition result is the correct transcription of the utterance, and calculating the intelligibility score further includes adjusting the intelligibility score based on the confidence score and/or the pronunciation score. In some embodiments, adjusting the intelligibility score includes changing the intelligibility score by a first penalty value, wherein the first penalty value is determined based on the larger of the confidence score and the pronunciation score. In some embodiments, adjusting the intelligibility score includes changing the intelligibility score by a second penalty value if the pronunciation score is less than a threshold value, wherein the second penalty value is determined based on the pronunciation score.

The actions of the method may further include generating, by the automatic speech recognition (ASR) module, respective confidence scores for each of the N recognition results, wherein each respective confidence score indicates a probability that the corresponding recognition result is a correct transcription of the utterance. The actions of the method may further include, for each of the confidence scores, determining whether the respective confidence score is less than a threshold value, and if so, setting the respective confidence score to the threshold value. The actions of the method may further include generating, by a pronunciation assessment module, the pronunciation score for the utterance. In some embodiments, N is greater than 1 and less than or equal to 5.

Particular embodiments of the subject matter described in this specification can be implemented so as to realize one or more of the following advantages. In some embodiments, a language teaching and learning application can provide intelligibility scores (or information derived from intelligibility scores) to users of the application as feedback regarding the intelligibility of their speech, which can help such users identify and correct deficiencies in their speech skills. Such intelligibility feedback can be provided (e.g., displayed) with or without feedback on the user's pronunciation. For example, the application may (1) prompt a user to verbalize a sample text, (2) assess the intelligibility (and, optionally, pronunciation) of the user's utterance, and (3) provide feedback on the intelligibility (and, optionally, pronunciation) of the utterance to the user. In some embodiments, voice interface applications and/or communication applications can use intelligibility scores to perform other functions described herein.

Details of one or more embodiments of the subject matter of this disclosure are set forth in the accompanying drawings and the description below. Other features, aspects, and advantages of the subject matter will become apparent from the description, the drawings, and the claims.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

FIG. 4 shows a flowchart of a method for measuring speech intelligibility, according to some embodiments.

DETAILED DESCRIPTION OF THE DISCLOSURE

Automatic Speech Recognition (ASR)

As described above, an automatic speech assessment (ASA) system may use automatic speech recognition (ASR) techniques to perform certain tasks, for example, processing the speech uttered by a user in response to a prompt from ASA system to provide N-best output corresponding to the user's speech and/or confidence score(s) assigned to one or more of the speech recognition results included in the N-best output. In this section, some examples of ASR techniques are described. However, one of ordinary skill in the art will appreciate that any suitable ASR techniques may be used to perform the speech processing tasks described herein. The ASR techniques described herein are not limiting.

In general, automatic speech recognition (ASR) modules can process and recognize spoken human speech, and take action or carry out further processing based on the recognized speech or attributes thereof. Such systems are now widely used in a variety of applications including voice user interfaces for computers and electronic devices (including but not limited to smart phones, smart speakers, and smart televisions); speech-to-text processing (or "transcription"); voice interfaces for data entry applications, customer service applications, travel reservation applications, order entry applications, etc.; language teaching and learning applications; etc.

ASR modules generally operate by receiving an "acoustic signal" or "speech signal" (e.g., an electronic signal or data set that represents the acoustic energy received at a transducer from a spoken utterance). The ASR module then generally tries to find a sequence of text characters ("word string") which maximizes the probability P(A|W)*P(W), where A is the acoustic signal and W is a word string. The P(A|W) component may be determined using an acoustic model, and the P(W) component may be determined using a language model. A language model for a particular application may be trained by obtaining a large number of language samples (e.g., transcribed utterances) representative of speech that users of the application are expected to utter, and providing those language samples to a language model training program that produces a word-based language model that can be used to estimate P(W) for a word string W. Examples of word-based language models include bigram models, trigram language models, or more generally, n-gram language models. In a sequence of words in an utterance, $W_0$-$W_M$, an n-gram language model estimates the probability that an utterance is word $W_J$ given the previous n−1 words. Thus, in a trigram language model, P($W_J$|utterance) is estimated by P($W_J$|$W_J$−1, $W_J$−2).

Figure 1:
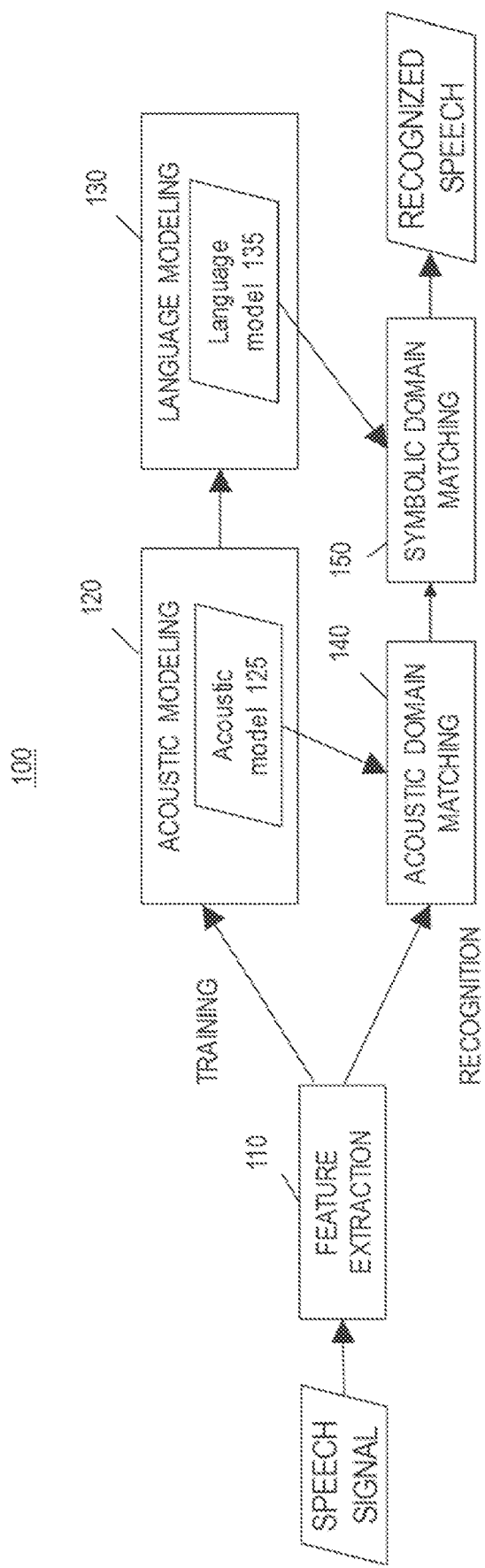
FIG. 1 shows a dataflow diagram of another example of a module that performs ASR.

FIG. 1 illustrates an example of high-level processing steps that may be performed by an ASR module 100. In the example of FIG. 1, these processing steps include a feature extraction step 110, an acoustic modeling step 120, a language modeling step 130, an acoustic domain matching step 140, and a symbolic domain matching step 150. In the example of FIG. 1, the acoustic modeling step 120 and the language modeling step 130 are performed during a training phase of the ASR module's operation, whereas the matching steps 140 and 150 are performed during a recognition phase of the ASR module's operation. The processing steps shown in FIG. 1 are provided by way of example and are not limiting. An ASR module may perform any suitable processing steps, including but not limited to the processing steps described in S. J. Arora, R. Singh, "Automatic Speech Recognition: A Review," International Journal of Computer Applications, vol. 60, no. 9, December 2012.

During the training phase, the ASR module 100 may follow a rigorous training procedure to map the basic speech units (e.g., phonemes, syllables, etc.) to the corresponding acoustic observations. In the training phase, known speech may be obtained and the feature extraction step 110 may be performed. In the example of FIG. 1, the feature extraction step 110 may include pre-processing the speech signal and extracting features from the pre-processed speech signal.

In the acoustic modeling step 120, an acoustic speech model 125 may be trained. The trained acoustic speech model 125 may establish links between (1) speech parameters and/or features and (2) the speech segments (e.g., phonemes) and corresponding symbols of the language of the speech. Thus, the trained acoustic speech model 125 may be used to infer a string of speech segments corresponding to a speech signal.

In the language modeling step 130, a language model 135 may be trained. The trained language model 135 may establish links between (1) speech segments and (2) words, phrases, or sentences. In the case of an isolated word recognizer, a trained language model may establish links between speech segments and a simple list of words. In some cases, a trained language model may establish links between speech segments and words or phrases subject to the rules of context-free grammar. In the case of a language model for large vocabulary continuous speech recognition, the trained language model 135 may be a statistical language model that probabilistically infers links between speech segments and words or phrases based on observed speech patterns in a training corpus.

In the acoustic modeling step and/or the language modeling step, the ASR module 100 may use probabilistic models to deal with incomplete information. For example, the ASR module 100 may use hidden Markov modeling (HMM) techniques to train the acoustic model and/or the language model. HMI techniques are characterized by a finite state Markov model and a set of output distributions (see Z. Ghahramani, "An Introduction to Hidden Markov Models and Bayesian Networks", International Journal of Pattern Recognition and Artificial Intelligence 15(1): 9-42, (2001), 25 pages). Alternatively, the acoustic model or the language model (or both models) may be implemented using a deep neural network (DNN). Any suitable techniques may be used to train the acoustic model 125 and/or the language model 135.

During the recognition phase, the ASR module 100 may obtain a speech signal representing unknown speech and perform feature extraction 110 to generate a series of acoustic feature vectors corresponding to the speech signal. As discussed above, the feature extraction step may also involve performing acoustic analysis (e.g., pre-processing) on the speech signal. In the acoustic domain matching step 140, the acoustic model 125 may be applied to the acoustic feature vectors to generate a speech segment string corresponding to the speech signal. For example, pattern matching analysis may be performed to identify the speech segments with acoustic features that most closely match the acoustic feature vectors. In the symbolic domain matching step 150, the language model 135 may be applied to the speech segment string to generate a sequence of linguistic units. For example, pattern matching analysis may be performed to identify the sequence of linguistic units that is the most probable match for the sequence of speech segments generated during the acoustic domain matching step.

Figure 2:
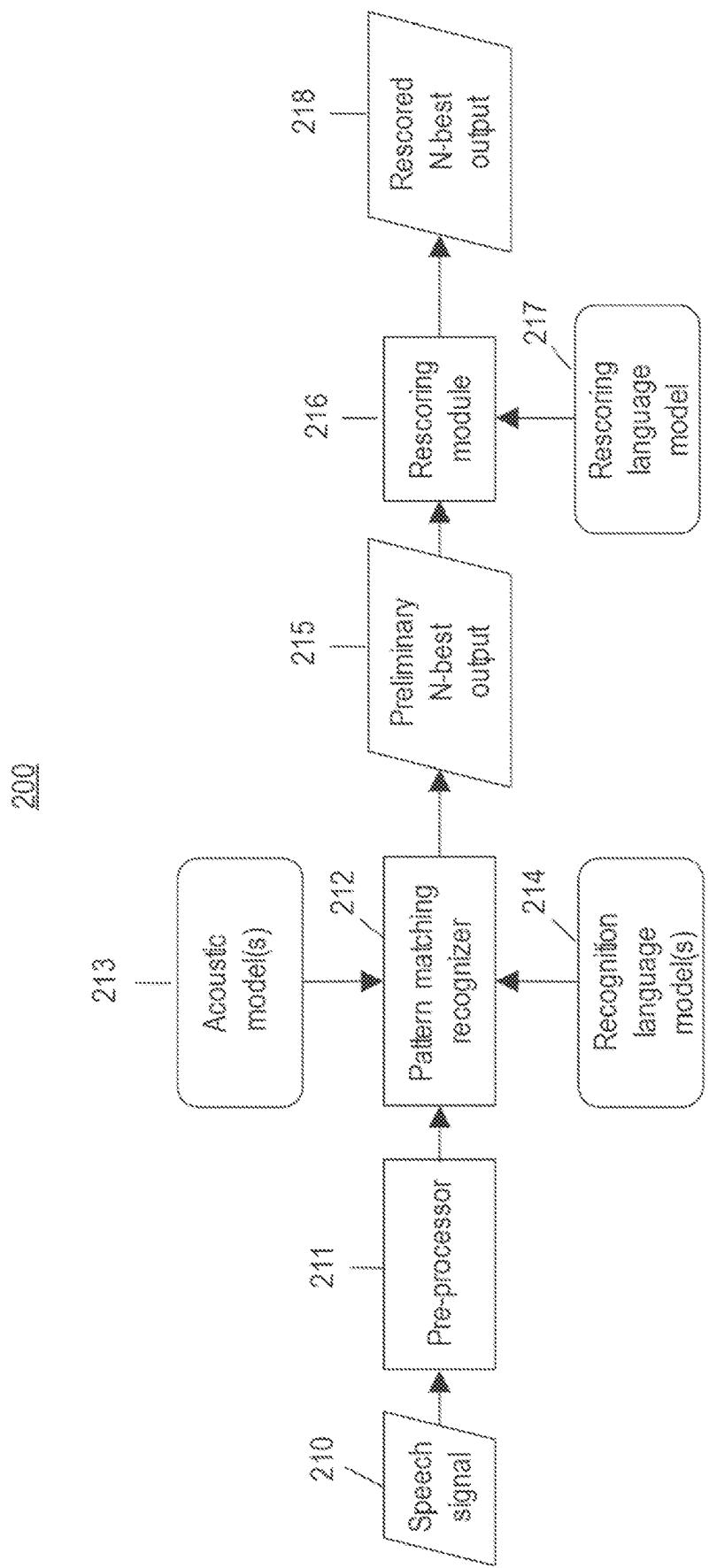
FIG. 2 shows a hybrid dataflow/block diagram of yet another example of a module that performs ASR.

Referring to FIG. 2, in some examples, an ASR module 200 processes a speech signal 210 representing an utterance to generate an N-best output (e.g., the N most probable recognition results for the utterance). In some examples, the ASR module 200 also generates one or more confidence scores corresponding to the N-best output. The ASR module 200 may include a pre-processor 211, a pattern matching recognizer 212, one or more acoustic models 213, and one or more recognition language models 214. In some examples, the ASR module 200 may also include a rescoring module 216 and one or more rescoring language models 217. The system architecture shown in FIG. 2 is provided by way of example and is not limiting. An ASR module may have any suitable architecture.

In the ASR module 200, a speech signal 210 is received by a pre-processor 211. If the speech signal 210 has not already been pre-processed, or if the signal pre-processing is not complete, the pre-processor 211 may perform signal pre-processing (e.g., waveform modification, frequency spectrum filtering, etc.). When the speech signal 210 is in suitable condition, the pre-processor 211 extracts speech parameters of the speech signal. In some embodiments, the pre-processor 211 also identifies features of the speech based on the extracted speech parameters.

In the ASR module 200, the pattern matching recognizer 212 identifies the "best" recognition result 215 (e.g., the word sequence that has the highest probability of corresponding to the speech signal 210) based on the acoustic models 213 and a recognition language model 214. Some examples of acoustic models and language models are described above.

Confidence Scores

Still referring to FIG. 2, the accuracy of the recognition results provided by an ASR module 200 can be gauged by confidence scores. In general, confidence scores provide an indication of the reliability of the transcription provided by the ASR module. The pattern matching recognizer 212, for example, may generate confidence scores for recognition results (e.g., words, phrases, sentences, etc.) and return those confidence scores with the corresponding recognition results. The confidence score corresponding to a recognition result may represent the estimated likelihood that the recognition result correctly represents the corresponding speech. For example, a confidence score can be computed for each recognized word to indicate the individual likelihood that each word has been correctly recognized, and/or a confidence score can be computed for an entire utterance to indicate the likelihood that the utterance as a whole has been correctly recognized.

The ASR module 200 may estimate confidence scores for the system's recognition results using any suitable techniques, including but not limited to the techniques described in H. Jiang, "Confidence measures for speech recognition: A survey," Speech Communication, vol. 45, no. 4, pp. 455-470, 2005. In some cases, confidence scores are encoded as values between 0 and 1 (or between 0 and 100).

To estimate the confidence that a particular word included in a recognition result (e.g., a "textual prediction" or "hypothesis") is correct, the ASR module 200 may determine a prior probability associated with the particular word based at least in part on how often that particular word has been correct when recognized during previous ASR processing, such as in a separate large training set during a testing phase of ASR training or during previous run-time operation. For example, the device may determine a number of correct predictions (e.g., number of correct results) and a total number of predictions (e.g., number of observations) for the particular word in the previous ASR processing. The device may determine the prior probability for a particular word by dividing the number of correct results by the number of observations for the particular word. However, words that appear infrequently can be problematic because they have 'noisy' probabilities that may vary from the true probability due to the small number of observed examples. Other techniques for determining confidence scores may be used.

N-Best Output

Rather than providing only a single, most probable ("best") recognition result, speech recognition modules may provide the N most probable recognition results (e.g., the N "best matching" recognition hypotheses), where N is an integer greater than or equal to 1. In such systems, the provided set of N recognition results may be referred to as the system's "N-best output." Each of the individual recognition results included in a system's N-best output for an utterance can be an individual speech segment (e.g., word or part of a word) or a sequence of speech segments (e.g., a sequence of words, a phrase, a sentence, etc.).

In the example of FIG. 2, the pattern matching recognizer 212 provides a preliminary N-best output for the utterance encoded as the speech signal 210. N can be any suitable positive integer, for example, 1, 2, 3, 4, 5, or more. In some cases, the individual recognition results within the N-best output may be provided as an ordered list (e.g., a list of individual recognition results arranged in descending order from the most probable of the individual recognition results to the least probable of the individual recognition results). One of ordinary skill in the art will appreciate that when N=1, the preliminary N-best output reduces to a 1-best output (e.g., the most probable individual recognition result).

In some embodiments, the pattern matching recognizer 212 also provides one or more confidence scores with the N-best output. For example, the pattern matching recognizer 212 may provide a confidence score for the most probable recognition result included in the N-best output. As another example, the pattern matching recognizer 212 may provide N confidence scores for the N-best output (e.g., one confidence score for each recognition result included in the N-best output).

In some examples, the ASR module 200 may include a rescoring module 216 that can re-score the preliminary N-best output 215. Such rescoring may be performed, for example, using additional information that was not available to the pattern matching recognizer 212 when it initially generated the preliminary N-best output. Such extra information may come from any suitable source including but not limited to one or more rescoring language models 217. A rescoring language model 217 may be, for example, a statistical language model (SLM) that contains information about the a priori likelihood of different recognition hypotheses (e.g., the N recognition results included in the preliminary N-best output 215). Even if the language model used by the pattern matching recognizer 212 to generate the preliminary N-best output 215 is itself a statistical language model, the N-best output can still be rescored using another SLM (e.g., a more sophisticated SLM). Any suitable techniques for rescoring the preliminary N-best output 215 may be used, including but not limited to the techniques described in U.S. Pat. No. 6,519,562 ("Dynamic Semantic Model").

In some examples, the ASR module 200 processes a speech signal 210 representing an utterance to generate an N-best output for the utterance and one or more confidence scores corresponding to the N-best output. The N-best output for the utterance may be, for example, the preliminary N-best output 215 or the rescored N-best output 218. The confidence score(s) provided with the N-best output may be the confidence scores associated with the preliminary N-best output 215 or the confidence score(s) associated with the rescored N-best output 218.

Measuring Speech Intelligibility

As used herein, "intelligibility" refers to the extent or degree to which a person's speech in a given language is likely to be understood by listeners who are proficient (e.g., fluent) in that language. The intelligibility of a person's speech may be related to the person's accent and/or pronunciation, but intelligibility is distinct from accent and pronunciation. For example, a person may have a very distinct accent and make clear pronunciation errors, yet the person's speech may be fully or highly intelligible to a listener who is proficient in the language. On the other hand, another person with less of an accent may make specific pronunciation mistakes that make the person's speech completely or highly unintelligible to language-proficient listeners. Also, a person's speech may be unintelligible for reasons unrelated to accent and/or pronunciation, including but not limited to a speech impairment, unfamiliarity with the language, age, and/or any other reasons.

Figure 3:
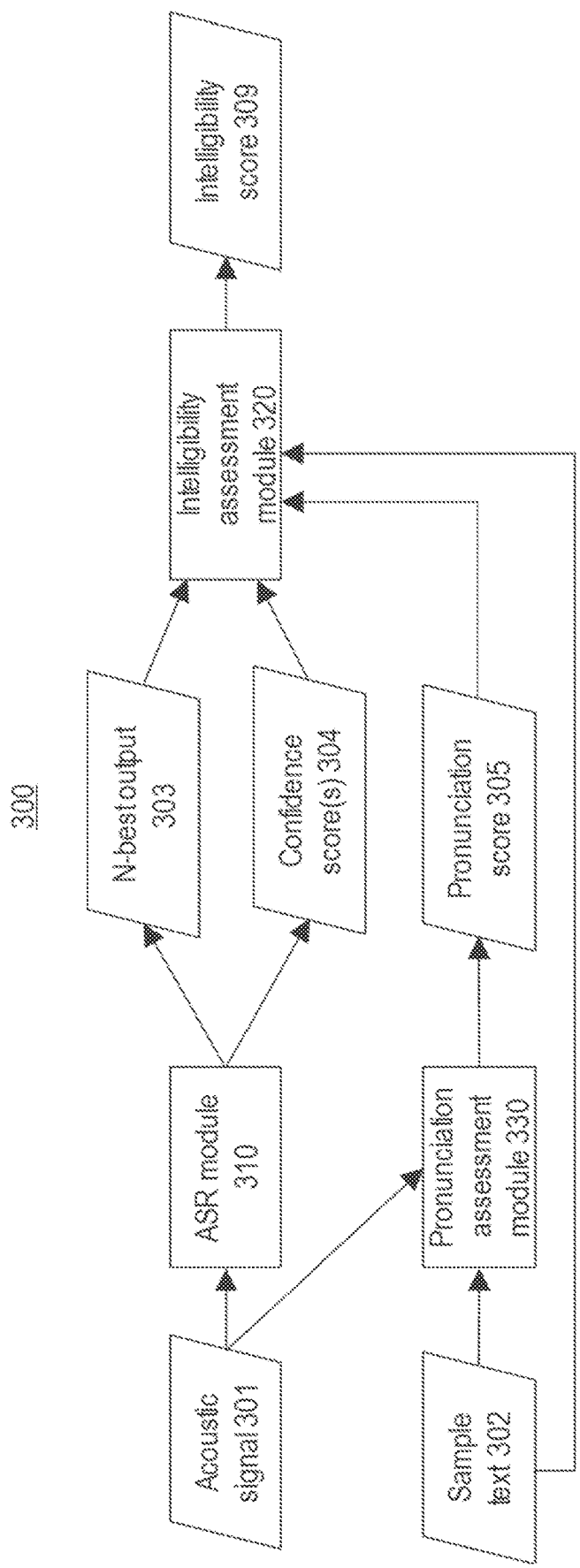
FIG. 3 shows a hybrid dataflow/block diagram of an automatic speech assessment (ASA) system, according to some embodiments.

Referring to FIG. 3, an automatic speech assessment system 300 may process an acoustic signal 301 encoding an utterance to generate an intelligibility score 309 representing the intelligibility of the utterance. The utterance may be a user's verbalization of a sample text 302. The sample text 302 may be any suitable text, including but not limited to text that the ASA system 300 provides to the user and prompts the user to read aloud, text provided to the system as a transcription of an utterance made by the user, etc. In some embodiments, the ASA system 300 includes an automatic speech recognition (ASR) module 310 and an intelligibility assessment module 320. In some embodiments, the ASA system 300 further includes a pronunciation assessment module 330. Some aspects of the operation of the ASA system 300 and its modules are described in further detail below.

In the example of FIG. 3, the ASR module 310 receives the acoustic signal 301 encoding the user's utterance and performs speech recognition operations on the acoustic signal 301 to generate the N-best output 303 for the utterance, wherein N is a positive integer. The ASR module 310 provides the N-best output 303 to the intelligibility assessment module 320. The ASR module 320 may be, for example, an ASR module 100 or 200.

In the example of FIG. 3, the intelligibility assessment module 320 generates an intelligibility score 309 representing the intelligibility of the user's utterance based on the sample text 302 and the N-best output 303 provided by the ASR module 310 for the acoustic signal 301. In some embodiments, the process of generating the intelligibility score 309 includes two phases: (1) calculating conditional intelligibility value(s) for the recognition result(s) included in the N-best output; and (2) determining the intelligibility score 309 based on the conditional intelligibility value of the most intelligible recognition result. Optionally, the process of generating the intelligibility score may include a third phase, in which the intelligibility assessment module 320 adjusts the intelligibility score 309 to account for environmental information (e.g., a pronunciation score for the user's utterance and/or a confidence score for the best recognition result). Some embodiments of these three intelligibility scoring phases are described in further detail below.

Phase 1: Calculating Conditional Intelligibility Value(s)

In the first phase of the intelligibility scoring process, the intelligibility assessment (IA) module 320 may determine (e.g., calculate) a conditional intelligibility values for each of the N recognition results. The conditional intelligibility value corresponding to a given recognition result RR may represent the conditional intelligibility of the utterance, assuming that the recognition result RR is the correct transcription of the utterance.

The IA module 320 may determine the conditional intelligibility values for the N recognition results using any suitable technique. In some embodiments, the IA module 320 normalizes the sample text 302 and the N recognition results included in the N-best output 303. Normalizing the sample text and the recognition results may facilitate the process of comparing each of the recognition results to the sample text. Any suitable normalization techniques may be used, including but not limited to converting numeric text (representing numbers) into alphabetic text (representing the same numbers), converting text representing dates and/or times to a uniform format, converting text representing currency amounts to a uniform format, etc.

After normalizing the sample text and the N recognition results, the IA module 320 may determine the conditional intelligibility value for each normalized recognition result based on a word-to-word alignment match between the normalized recognition result and the normalized sample text. In some embodiments, determining the word-to-word alignment match between a normalized recognition result and the normalized sample text involves (1) determining (e.g., calculating) a distance (e.g., an edit distance) between the normalized sample text and the normalized recognition result, (2) determining (e.g., calculating) an error rate of the normalized recognition result based on the edit distance, and (3) determining (e.g., calculating) the conditional intelligibility value for the recognition result based on the error rate of the normalized recognition result.

Any suitable technique for determining the edit distance between the (normalized) sample text and a (normalized) recognition result may be used. In some embodiments, the edit distance calculation of the Kaldi speech recognition toolkit may be used. See D. Povey et al., "The Kaldi speech recognition toolkit," in *IEEE Automatic Speech Recognition and Understanding Workshop (ASRU)*, 2011. In some embodiments, the Levenshtein Distance between the normalized sample text and recognition result may be used. In some embodiments, the Kaldi edit distance or the Levenshtein Distance calculations may be modified to assess a "cost" (distance penalty) for insertions and deletions, and the modified Kaldi edit distance or modified Levenshtein Distance may be used as the edit distance.

Any suitable technique for determining the error rate of a (normalized) recognition result based on the edit distance for the result may be used. In some embodiments, the error rate for a recognition result is the edit distance for the recognition result divided by the number of text elements, where the number of text elements is the number of words in the (normalized) sample text plus the number of insertions made in the (normalized) recognition result to calculate the edit distance.

Any suitable technique for determining the conditional intelligibility value for a recognition result may be used. In some embodiments, the conditional intelligibility value for a recognition result is 1−error_rate, where error_rate is the error rate of the (normalized) recognition result.

Phase 2: Determining the Initial Intelligibility Score

In the second phase of the intelligibility scoring process, the IA module 320 may determine, based on the conditional intelligibility values, which of the recognition results is most intelligible. For example, the intelligibility values may be provided within a range of 0.0 to 1.0 or a range of 0 to 100, with larger values representing greater intelligibility and smaller values representing less intelligibility. In this example, the IA module 320 may identify the recognition result with the highest conditional intelligibility value as the most intelligible recognition result.

The IA module 320 may then determine (e.g., calculate) the initial intelligibility score for the user's utterance based on the conditional intelligibility value of the most intelligible recognition result. If the most intelligible recognition result is the 1-best recognition result provided by the ASR module 310, the IA module 320 may use the conditional intelligibility value of the most intelligible recognition result as the initial intelligibility score for the user's utterance. As used herein, the 1-best recognition result is the most probable recognition result included in ASR module's N-best output 303, which may also be described herein as the recognition result that has the highest estimated likelihood of correctly representing the user's utterance. The most intelligible recognition result may be the 1-best recognition result, for example, if the N-best output provided by the ASR module 310 is a 1-best output (such that only one recognition result is available for analysis), or if the conditional intelligibility values assigned to the (normalized) recognition results in phase 1 indicate that the 1-best recognition result is the most intelligible recognition result.

If the most intelligible recognition result is not the 1-best recognition result, the IA module 320 may calculate the initial intelligibility score of the user's utterance based on the conditional intelligibility value of the most intelligible recognition result ($RR_{MI}$) and the conditional intelligibility value of the 1-best recognition result ($RR_{1B}$). For example, the initial intelligibility score may be calculated as a weighted sum of the conditional intelligibility values of $RR_{MI}$ and $RR_{1B}$. For example, the initial intelligibility score for the user's utterance may be equal to $(1-w)*CIV(RR_{1B}) + w*CIV(RR_{MI})$, where $CIV(RR_X)$ represents the conditional intelligibility value CIV of recognition result X, and w is a weight assigned to most intelligible recognition result. In some embodiments, the weight w is 0.60 if the most intelligible recognition result is the 2-best recognition result, 0.53 if the most intelligible recognition result is the 3-best recognition result, 0.46 if the most intelligible recognition result is the 4-best recognition result, 0.39 if the most intelligible recognition result is the 5-best recognition result, and so on.

Relative to intelligibility assessment techniques that consider only the 1-best recognition results of ASR modules, determining initial intelligibility scores for users' utterances based on the N-best outputs 303 of the ASR module 310 can improve the accuracy of intelligibility scores. For example, considering only the 1-best recognition result can artificially decrease the intelligibility score when the user utters a homophone (a verbalization that sounds very similar to multiple different words, e.g., "flower" vs. "flour") or an oronym (a verbalization that sounds very similar to multiple different phrases, e.g., "The good can decay many ways" vs. "The good candy came anyways"). Correctly recognizing homophones and oronyms can be particularly difficult for some ASR modules, even when the user's speech is highly intelligible. Thus, when a user intelligibly utters a homophone or an oronym, an ASR module's 1-best recognition result may very well not match the sample text, but the ASR module's N-best output is likely to include a recognition result that matches the sample text, even if N is small (e.g., N=2 or N≤5). Thus, determining the initial intelligibility score for a user's utterance based on the N-best output 303 of an ASR module can improve the accuracy of the intelligibility score by compensating for an artificial "intelligibility penalty" that arises when the user utters a homophone or oronym and only the 1-best recognition result is considered.

On the other hand, there are scenarios in which ASR modules can recognize a user's speech from context even when the speech is not highly intelligible to human listeners. In such scenarios, considering only the conditional intelligibility value of the most intelligible recognition result can artificially inflate the intelligibility score for an utterance, particularly if the most intelligible recognition result is not the 1-best recognition result. Determining the initial intelligibility score for a user's utterance based on a weighted sum of the conditional intelligibility value of the most intelligible recognition result ($RR_{MI}$) and the conditional intelligibility value of the 1-best recognition result ($RR_{1B}$) can improve the accuracy of the intelligibility score by compensating for the artificial "intelligibility boost" that arises in these scenarios.

Phase 3: Adjusting the Intelligibility Score to Account for Environmental Information Still referring to FIG. 3, in some embodiments, the second phase of intelligibility scoring is the final phase, and the intelligibility score 309 assigned to an utterance is simply the initial intelligibility score determined during the second phase of intelligibility scoring. In some embodiments, the initial intelligibility score is adjusted to account for environmental information during a third phase of intelligibility scoring, and the intelligibility score 309 assigned to an utterance is the adjusted intelligibility score determined during the third phase of intelligibility scoring. Any suitable environmental information can be used to adjust the initial intelligibility score during the third phase of intelligibility scoring, including but not limited to confidence information (e.g., ASR module confidence scores) and/or pronunciation information (e.g., pronunciation scores).

In some embodiments, the ASR module 310 provides confidence scores 304 for one or more of the N recognition results included in the N-best output. For example, the ASR module 310 may provide a confidence score for the 1-best recognition result. In some cases, the ASR module 310 may provide confidence scores for each of the N recognition results included in the N-best output. The confidence score(s) 304, if any, may be provided to the intelligibility assessment module 320.

In some embodiments, the IA module 320 establishes a floor under one or more of the confidence score(s) 304, such that confidence scores lower than a threshold value are increased to match the threshold value. For example, the IA module may establish a floor under all the confidence score(s) 304, or under the confidence scores for any words that are determined to be uncommon. Any suitable technique may be used to determine whether a word is uncommon. For example, a word may be classified as "uncommon" if the prevalence (e.g., rate of occurrence) of the word in a corpus of text or speech is below a threshold prevalence. The IA module's adjusted confidence score(s) may be referred to herein as "floored confidence score(s)." The rationale for using floored confidence scores to adjust the initial intelligibility score for an utterance is described below.

In some embodiments, the ASA system 300 includes a pronunciation assessment module 330, which processes the acoustic signal 301 encoding the user's utterance and the sample text 302 to assess the user's pronunciation, and generates a pronunciation score 305 indicating the quality of the user's pronunciation (e.g., how well the user pronounced the phonemes in the user's verbalization of the sample text). Any suitable technique for scoring the user's pronunciation (e.g., phoneme-level pronunciation) may be used, including but not limited to the techniques described by X. Anguera et al. in "English Language Speech Assistant," *INTERSPEECH* 2016: *Show & Tell Contribution*, 2016.

In the third phase of intelligibility scoring, the IA module 320 may adjust (e.g., penalize) the initial intelligibility score based on the confidence score(s) 304, the floored confidence score(s), and/or the pronunciation scores 305 (collectively, the "environmental scores"). In some embodiments, the IA module 320 may determine one or more adjustment factors F based on the environmental scores and adjust the intelligibility score S based on the adjustment factors F. Any suitable technique for adjusting the intelligibility score based on the adjustment factor(s) may be used. For example, the adjusted intelligibility score may be calculated by subtracting the adjustment factor(s) from the initial intelligibility score, multiplying the initial intelligibility score by the adjustment factor(s), etc.

As just one example, the IA module 320 may determine an adjustment factor F1 by calculating the square root of the largest environmental score assigned to the most intelligible recognition result, e.g., $$F1=\text{sqrt}(\max(cs(RR_{MI}),ps(RR_{MI}))), \text{ or}$$

$$F1=\text{sqrt}(\max(fcs(RR_{MI}),ps(RR_{MI}))),$$

where cs(RR) is the confidence score 304 assigned to a recognition result RR, fcs(RR) is the floored confidence score 304 assigned to a recognition result RR, and ps(RR) is the pronunciation score 305 assigned to a recognition result RR.

As discussed above, there are scenarios in which the ASR module 310 can correctly recognize a user's speech (e.g., from context) even when the speech is not highly intelligible to human listeners. By adjusting the intelligibility score according to adjustment factor F1, the IA module 320 may compensate for artificially high initial intelligibility scores that may be assigned when (1) the user's pronunciation of the sample text 302 is not good, and/or (2) the ASR module's confidence in the accuracy of the most intelligible recognition result is not high.

In connection with adjustment factor F1, using the floored confidence score rather than the raw confidence score 304 may avoid scenarios in which the intelligibility score is over-penalized because the recognized word is uncommon. The confidence scores assigned to uncommon words by the ASR module 310 may tend to be somewhat low, even when the uncommon word is pronounced well and recognized clearly. For this reason, flooring the confidence scores of uncommon words may be particularly beneficial.

Additionally or alternatively, if the pronunciation score assigned to the most intelligible recognition result is less than a threshold value T (e.g., 0.85), the IA module 320 may determine an adjustment factor F2 by calculating the square root of the quantity 1 minus T plus the pronunciation score assigned to the most intelligible recognition result, e.g., $F2=\text{sqrt}(1-T+ps(RR_{MI}))$. By adjusting the intelligibility score according to adjustment factor F2, the IA module 320 may account for the negative effect of poor (or very poor) pronunciation on the intelligibility of a user's speech.

A Speech Intelligibility Measurement Method

Referring to FIG. 4, a method 400 for measuring speech intelligibility is shown. The method 400 may be performed, for example, by the ASA system 300. The method 400 may include steps of receiving 410 an acoustic signal encoding an utterance of a user, generating 420 an N-best output corresponding to the utterance, and generating 430 an intelligibility score representing the intelligibility of the utterance based on the N-best output and the sample text. In some embodiments, (1) N is at least 2, (2) the intelligibility score is also based on a confidence score indicating the probability that a particular one of the N recognition results is a correct transcription of the utterance, and/or (3) the intelligibility score is also based on a pronunciation score indicating an extent to which the utterance exhibits correct pronunciation of the sample text. Some embodiments of the steps of the method 400 are described in further detail below.

In step 420, an N-best output corresponding to the user's utterance is generated. The N-best output may be generated, for example by an ASR module (e.g., the ASR module 310). The N-best output may include the N-best recognition results generated by the ASR module for the utterance. N may be a positive integer (e.g., 1, 2, 3, 4, 5, or an integer greater than 5). In some embodiments, N is greater than or equal to 1 and less than or equal to 5.

In step 430, an intelligibility score representing the intelligibility of the user's utterance is generated based, at least in part, on the N-best output. In some embodiments, generating the intelligibility score includes sub-steps of (1) calculating N conditional intelligibility values corresponding, respectively, to the N recognition results, (2) determining, based on the conditional intelligibility values, which of the recognition results is most intelligible, and (3) calculating the intelligibility score based, at least in part, on the conditional intelligibility value of the most intelligible recognition result. Each of the conditional intelligibility values $CIV_J$ may represent a conditional intelligibility of the utterance assuming that the recognition result $RR_J$ corresponding to the conditional intelligibility value $CIV_J$ is the correct transcription of the utterance.

In some embodiments, the N conditional intelligibility values are calculated by (1)(A) normalizing the sample text and the N recognition results, and (1)(B) for each of the N normalized recognition results $NRR_J$: (i) calculating an edit distance $ED_J$ between the normalized sample text and the normalized recognition result $NRR_J$, (ii) calculating an error rate $ER_J$ of the normalized recognition result $NRR_J$ based on the edit distance $ED_J$, and (iii) calculating the conditional intelligibility value $CIV_J$ based on the error rate $ER_J$ of the normalized recognition result $NRR_J$. Some non-limiting examples of techniques for normalizing sample text and recognition results are described herein. Some non-limiting examples of techniques for calculating edit distances and error rates are described herein. Some non-limiting examples of techniques for calculating conditional intelligibility values based on error rates are described herein.

If N is 1 or the most intelligible recognition result is the 1-best recognition result, the intelligibility score for the utterance may be the conditional intelligibility value of the most intelligible recognition result. Otherwise (i.e., N is greater than 1 and the most intelligible recognition result is not the 1-best recognition result), the intelligibility score for the utterance may be calculated based on the conditional intelligibility values of the most intelligible recognition result and the 1-best recognition result. Some non-limiting examples of techniques for calculating an intelligibility score based on the intelligibility values of two or more recognition results are described herein. For example, the intelligibility score may be calculated as a weighted sum of the conditional intelligibility values of the most intelligible recognition result and the 1-best recognition result.

In some embodiments, the method 400 further includes a step of generating confidence scores for each of the N recognition results. Each confidence score may indicate a probability that the corresponding recognition result is a correct transcription of the utterance. The confidence scores may be generated, for example, by an ASR module 310. Some non-limiting examples of techniques for generating confidence scores for recognition results are described herein.

In some embodiments, the method 400 further includes a step of generating a pronunciation score for the utterance. The pronunciation score may indicate an extent to which the utterance exhibits correct pronunciation of the sample text. The pronunciation score may be generated, for example, by a pronunciation assessment module 330. Some non-limiting examples of techniques for generating pronunciation scores for utterances are described herein.

In some embodiments, the intelligibility score is adjusted based on the confidence score $CS(RR_{MI})$ assigned to the most intelligible recognition result $RR_{MI}$ and/or based on the pronunciation score PS for the user's utterance. In some embodiments, the intelligibility score may be adjusted by a first penalty value, which may be determined based on the larger of the confidence score $CS(RR_{MI})$ and the pronunciation score PS. In some embodiments, the confidence score $CS(RR_{MI})$ may be floored before determining the first penalty value. In addition or in the alternative, if the pronunciation score PS is less than a threshold value (e.g., 0.85), the intelligibility score may be adjusted by a second penalty value, which may be determined based on the pronunciation score PS. Some non-limiting examples of techniques for determining such penalty values are described herein.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 5:
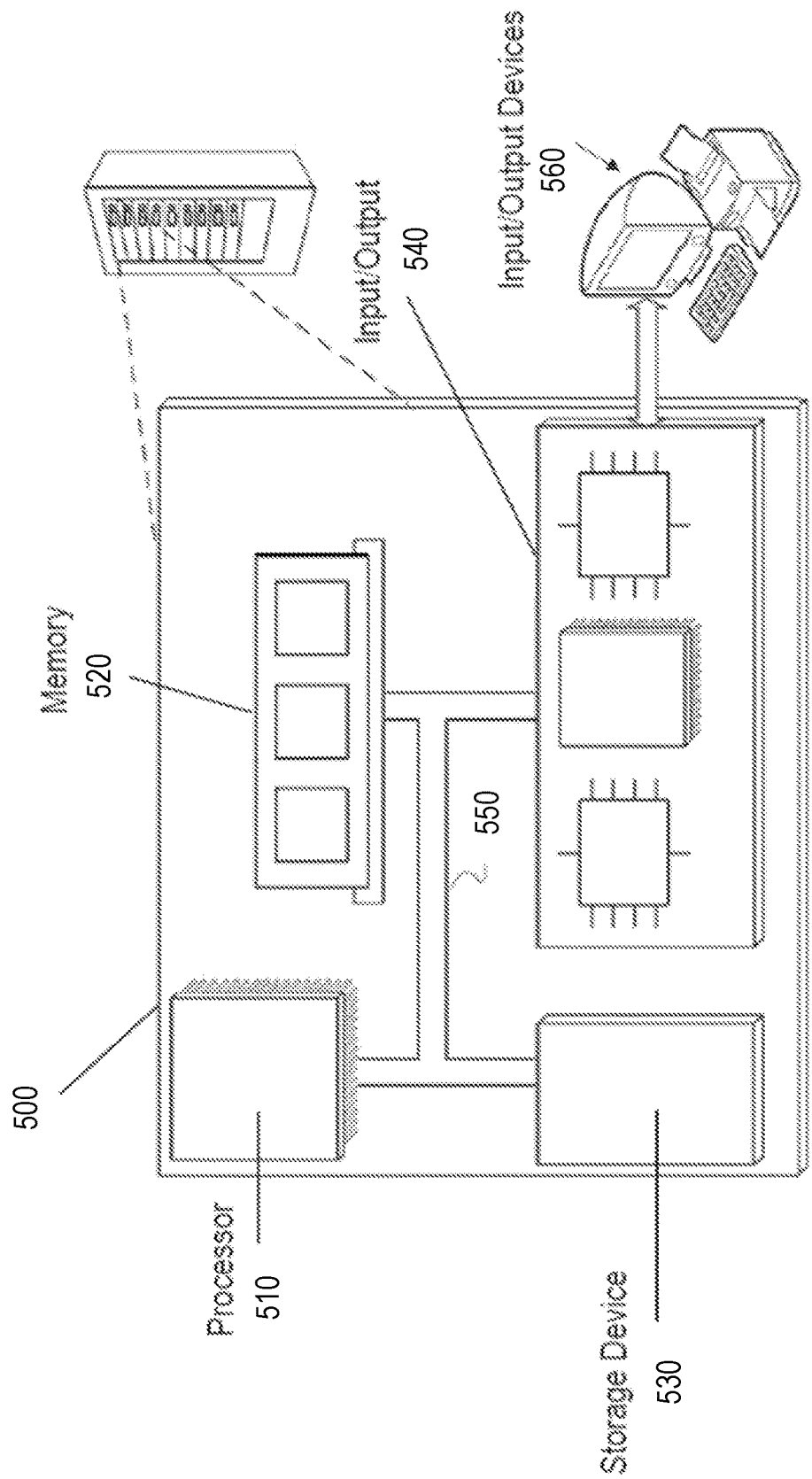
FIG. 5 is a diagram of an example of a computer system.

FIG. 5 is a block diagram of an example computer system 500 that may be used in implementing the technology described in this document. General-purpose computers, network appliances, mobile devices, or other electronic systems may also include at least portions of the system 500. The system 500 includes a processor 510, a memory 520, a storage device 530, and an input/output device 540. Each of the components 510, 520, 530, and 540 may be interconnected, for example, using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530.

The memory 520 stores information within the system 500. In some implementations, the memory 520 is a non-transitory computer-readable medium. In some implementations, the memory 520 is a volatile memory unit. In some implementations, the memory 520 is a non-volatile memory unit.

The storage device 530 is capable of providing mass storage for the system 500. In some implementations, the storage device 530 is a non-transitory computer-readable medium. In various different implementations, the storage device 530 may include, for example, a hard disk device, an optical disk device, a solid-date drive, a flash drive, or some other large capacity storage device. For example, the storage device may store long-term data (e.g., database data, file system data, etc.). The input/output device 540 provides input/output operations for the system 500. In some implementations, the input/output device 540 may include one or more of a network interface devices, e.g., an Ethernet card, a serial communication device, e.g., an RS-232 port, and/or a wireless interface device, e.g., an 802.11 card or a wireless modem (e.g., a 3G, 4G, or 5G wireless modem). In some implementations, the input/output device may include driver devices configured to receive input data and send output data to other input/output devices, e.g., keyboard, printer and display devices 560. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 530 may be implemented in a distributed way over a network, such as a server farm or a set of widely distributed servers, or may be implemented in a single computing device.

Although an example processing system has been described in FIG. 5, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phrasing and terminology used herein are for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of" or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of" or "exactly one of." "Consisting essentially of" when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A speech intelligibility scoring method, comprising:
receiving an acoustic signal encoding an utterance of a user, wherein the utterance comprises a verbalization of a sample text by the user;
generating, by an automatic speech recognition (ASR) module, an N-best output corresponding to the utterance, wherein the N-best output comprises N recognition results generated by the ASR module for the utterance, wherein N is a positive integer equal or greater than 2;
calculating N conditional intelligibility values corresponding, respectively, to the N recognition results, wherein each of the N conditional intelligibility values represents a conditional intelligibility of the utterance assuming that the respective recognition result corresponding to the respective conditional intelligibility value is a correct transcription of the utterance generated by the ASR module with respect to the sample text;

determining, based on the N conditional intelligibility values, which of the N recognition results is most intelligible; and generating an intelligibility score representing an intelligibility of the utterance based, at least in part, on (i) the conditional intelligibility of the most intelligible recognition result and (ii) a rank of the most intelligible recognition result within the N-best output, wherein the intelligibility score is set to a combined value and wherein the combined value is a weighted sum of the conditional intelligibility value of the most intelligible recognition result and the conditional intelligibility value of a 1-best recognition result.

2. The method of claim 1, wherein calculating the N conditional intelligibility values comprises:

normalizing the sample text and the N recognition results; and for each of the N normalized recognition results:
aligning the respective normalized recognition result to the normalized sample text on a word-for-word basis,
calculating an error rate of the aligned recognition result based on a number of errors in the aligned recognition result relative to the normalized sample text, and
calculating the respective conditional intelligibility value based on the error rate of the aligned recognition result.

3. The method of claim 2, wherein aligning the respective normalized recognition result to the normalized sample text on a word-for-word basis comprises:

calculating a distance between the normalized sample text and the respective normalized recognition result.

4. The method of claim 3, wherein the distance is an edit distance.

5. The method of claim 1, wherein the intelligibility score is further based on (i) a confidence score, wherein the confidence score indicates a probability that a particular one of the N recognition results is a correct transcription of the utterance, and/or (ii) a pronunciation score for the utterance, wherein the pronunciation score indicates an extent to which the utterance exhibits correct pronunciation of the sample text.

6. The method of claim 5, wherein the confidence score indicates the probability that the most intelligible recognition result is the correct transcription of the utterance, and wherein calculating the intelligibility score further comprises adjusting the intelligibility score based on the confidence score and/or the pronunciation score.

7. The method of claim 6, wherein adjusting the intelligibility score comprises changing the intelligibility score by a first penalty value, wherein the first penalty value is determined based on the larger of the confidence score and the pronunciation score.

8. The method of claim 7, wherein adjusting the intelligibility score further comprises changing the intelligibility score by a second penalty value if the pronunciation score is less than a threshold value, wherein the second penalty value is determined based on the pronunciation score.

9. The method of claim 6, wherein adjusting the intelligibility score comprises changing the intelligibility score by a penalty value if the pronunciation score is less than a threshold value, wherein the penalty value is determined based on the pronunciation score.

10. The method of claim 1, further comprising:
generating, by the automatic speech recognition (ASR) module, respective confidence scores for each of the N recognition results, wherein each respective confidence score indicates a probability that the corresponding recognition result is a correct transcription of the utterance.

11. The method of claim 10, further comprising:
for each of the confidence scores, determining whether the respective confidence score is less than a threshold value, and if so, setting the respective confidence score to the threshold value.

12. The method of claim 5, further comprising:
generating, by a pronunciation assessment module, a pronunciation score for the utterance.

13. The method of claim 1, wherein N is greater than 2 and less than or equal to 5.

14. A system comprising: one or more computers and one or more storage devices storing instructions that are operable, when executed by the one or more computers, to cause the one or more computers to perform operations comprising:

receiving an acoustic signal encoding an utterance of a user, wherein the utterance comprises a verbalization of a sample text by the user;

generating, by an automatic speech recognition (ASR) module, an N-best output corresponding to the utterance, wherein the N-best output comprises N recognition results generated by the ASR module for the utterance, wherein N is a positive integer equal to or greater than 2;

calculating N conditional intelligibility values corresponding, respectively, to the N recognition results, wherein each of the N conditional intelligibility values represents a conditional intelligibility of the utterance assuming that the respective recognition result corresponding to the respective conditional intelligibility value is a correct transcription of the utterance generated by the ASR module with respect to the sample text;

determining, based on the N conditional intelligibility values, which of the N recognition results is most intelligible; and generating an intelligibility score representing an intelligibility of the utterance based, at least in part, on (i) the conditional intelligibility value of the most intelligible recognition result from the N-best output and (ii) a rank of the most intelligible recognition result within the N-best output, wherein the intelligibility score is set to a combined value and wherein the combined value is a weighted sum of the conditional intelligibility value of the most intelligible recognition result and the conditional intelligibility value of a 1-best recognition result.

15. The system of claim 14, wherein generating the intelligibility score comprises:

initializing the intelligibility score based, at least in part, on the conditional intelligibility value of the most intelligible recognition result.

16. The system of claim 14,
wherein the intelligibility score is further based on (i) a confidence score, wherein the confidence score indicates a probability that a particular one of the N recognition results is a correct transcription of the utterance, and/or
(ii) a pronunciation score for the utterance, wherein the pronunciation score indicates an extent to which the utterance exhibits correct pronunciation of the sample text.

17. The system of claim 16, wherein the confidence score indicates the probability that the most intelligible recognition result is the correct transcription of the utterance, and wherein calculating the intelligibility score further comprises adjusting the intelligibility score based on the confidence score and/or the pronunciation score.

18. The system of claim 17, wherein adjusting the intelligibility score comprises:
changing the intelligibility score by a first penalty value, wherein the first penalty value is determined based on the larger of the confidence score and the pronunciation score; and
changing the intelligibility score by a second penalty value if the pronunciation score is less than a threshold value, wherein the second penalty value is determined based on the pronunciation score.

19. A computer storage medium having instructions stored thereon that, when executed by a data processing apparatus, cause the data processing apparatus to perform operations comprising:
receiving an acoustic signal encoding an utterance of a user, wherein the utterance comprises a verbalization of a sample text by the user;
generating, by an automatic speech recognition (ASR) module, an N-best output corresponding to the utterance, wherein the N-best output comprises N recognition results generated by the ASR module for the utterance, wherein N is a positive integer equal to or greater than 2;
calculating N conditional intelligibility values corresponding, respectively, to the N recognition results, wherein each of the N conditional intelligibility values represents a conditional intelligibility of the utterance assuming that the respective recognition result corresponding to the respective conditional intelligibility value is a correct transcription of the utterance generated by the ASR module with respect to the sample text;
determining, based on the N conditional intelligibility values, which of the N recognition results is most intelligible; and
generating an intelligibility score representing an intelligibility of the utterance based, at least in part, on (i) the conditional intelligibility value of the most intelligible recognition result from the N-best output and (ii) a rank of the most intelligible recognition result within the N-best output,
wherein the intelligibility score is set to a combined value and
wherein the combined value is a weighted sum of the conditional intelligibility value of the most intelligible recognition result and the conditional intelligibility value of a 1-best recognition result.

* * * * *

UNITED STATES PATENT AND TRADEMARK OFFICE
CERTIFICATE OF CORRECTION

PATENT NO. : 11,848,025 B2
APPLICATION NO. : 17/150341
DATED : December 19, 2023
INVENTOR(S) : Jorge Daniel Leonardo Proença et al.

It is certified that error appears in the above-identified patent and that said Letters Patent is hereby corrected as shown below:

In the Claims

At Column 21, Claim number 1, Line 12, replace: "conditional intelligibility of the most intelligible" with --conditional intelligibility value of the most intelligible--.

At Column 21, Claim number 5, Line 44-53, replace: "The method of claim 1, wherein the intelligibility score is further based on (i) a confidence score, wherein the confidence score indicates a probability that a particular one of the N recognition results is a correct transcription of the utterance, and/or (ii) a pronunciation score for the utterance, wherein the pronunciation score indicates an extent to which the utterance exhibits correct pronunciation of the sample text." with --The method of claim 1, further comprising: generating, by the automatic speech recognition (ASR) module, respective confidence scores for each of the N recognition results, wherein each respective confidence score indicates a probability that the corresponding recognition result is a correct transcription of the utterance.--

At Column 21, Claim number 6, Lines 54-59, replace: "The method of claim 5, wherein the confidence score indicates the probability that the most intelligible recognition result is the correct transcription of the utterance, and wherein calculating the intelligibility score further comprises adjusting the intelligibility score based on the confidence score and/or the pronunciation score." with --The method of claim 5, further comprising: for each of the confidence scores, determining whether the respective confidence score is less than a threshold value, and if so, setting the respective confidence score to the threshold value.--

At Column 21, Claim number 7, Lines 60-64, replace: "The method of claim 6, wherein adjusting the intelligibility score comprises changing the intelligibility score by a first penalty value, wherein the first penalty value is determined based on the larger of the confidence score and the pronunciation score." with --The method of claim 1, wherein N is greater than 2 and less than or equal to 5.--

At Column 21-22, Claim number 8, Line 65-Line 2, replace: "The method of claim 7, wherein adjusting the intelligibility score further comprises changing the intelligibility score by a second Signed and Sealed this
Nineteenth Day of March, 2024

*Katherine Kelly Vidal*
Katherine Kelly Vidal
*Director of the United States Patent and Trademark Office*

CERTIFICATE OF CORRECTION (continued)
U.S. Pat. No. 11,848,025 B2 penalty value if the pronunciation score is less than a threshold value, wherein the second penalty value is determined based on the pronunciation score." with --The method of claim 1, wherein the intelligibility score is further based on (i) a confidence score, wherein the confidence score indicates a probability that a particular one of the N recognition results is a correct transcription of the utterance, and/or (ii) a pronunciation score for the utterance, wherein the pronunciation score indicates an extent to which the utterance exhibits correct pronunciation of the sample text.--

At Column 22, Claim number 9, Lines 3-7, replace: "The method of claim 6, wherein adjusting the intelligibility score comprises changing the intelligibility score by a penalty value if the pronunciation score is less than a threshold value, wherein the penalty value is determined based on the pronunciation score." with --The method of claim 8, wherein the confidence score indicates the probability that the most intelligible recognition result is the correct transcription of the utterance, and wherein calculating the intelligibility score further comprises adjusting the intelligibility score based on the confidence score and/or the pronunciation score.--

At Column 22, Claim number 10, Lines 8-14, replace: "The method of claim 1, further comprising: generating, by the automatic speech recognition (ASR) module, respective confidence scores for each of the N recognition results, wherein each respective confidence score indicates a probability that the corresponding recognition result is a correct transcription of the utterance." with --The method of claim 9, wherein adjusting the intelligibility score comprises changing the intelligibility score by a first penalty value, wherein the first penalty value is determined based on the larger of the confidence score and the pronunciation score.--

At Column 22, Claim number 11, Lines 15-20, replace: "The method of claim 10, further comprising: for each of the confidence scores, determining whether the respective confidence score is less than a threshold value, and if so, setting the respective confidence score to the threshold value." with --The method of claim 10, wherein adjusting the intelligibility score further comprises changing the intelligibility score by a second penalty value if the pronunciation score is less than a threshold value, wherein the second penalty value is determined based on the pronunciation score.--

At Column 22, Claim number 12, Lines 21-22, replace: "The method of claim 5, further comprising: generating, by a pronunciation assessment module, a pronunciation score for the utterance." with --The method of claim 10, wherein adjusting the intelligibility score comprises changing the intelligibility score by a penalty value if the pronunciation score is less than a threshold value, wherein the penalty value is determined based on the pronunciation score.--

At Column 22, Claim number 13, Lines 24-25, replace: "The method of claim 1, wherein N is greater than 2 and less than or equal to 5." with --The method of claim 8, further comprising: generating, by a pronunciation assessment module, a pronunciation score for the utterance.--